United States Patent [19]

Bugbey et al.

[11] Patent Number: 4,993,552
[45] Date of Patent: Feb. 19, 1991

[54] PACKAGING DEVICE

[76] Inventors: Marc Bugbey, 345 Chester St. #1, Glendale, Calif. 91203; Michelle Agul, 106 N. Meridith Ave. #4, Pasadena, Calif. 91106

[21] Appl. No.: 507,984

[22] Filed: Apr. 12, 1990

[51] Int. Cl.⁵ .............................................. B65D 85/57
[52] U.S. Cl. ................................. 206/444; 206/45.34; 206/309
[58] Field of Search .......... 206/45.31, 45.34, 307-313, 206/387, 444, 445

[56] References Cited

U.S. PATENT DOCUMENTS

| | | | |
|---|---|---|---|
| 4,653,639 | 3/1987 | Traynor | 206/444 |
| 4,702,369 | 10/1987 | Philosophe | 206/312 |
| 4,736,840 | 4/1988 | Deiglmeier | 206/309 |
| 4,793,477 | 12/1988 | Manning et al. | 206/444 |
| 4,869,364 | 9/1989 | Bray | 206/444 |
| 4,877,130 | 10/1989 | Matuz | 206/309 |
| 4,905,831 | 3/1990 | Bagdis et al. | 206/313 |
| 4,919,259 | 4/1990 | Beaulieu | 206/444 |

FOREIGN PATENT DOCUMENTS

| | | | |
|---|---|---|---|
| 0243773 | 3/1963 | Australia | 206/309 |
| 2620258 | 3/1989 | France | 206/444 |
| 2187442 | 9/1987 | United Kingdom | 206/444 |

Primary Examiner—Jimmy G. Foster
Attorney, Agent, or Firm—James E. Brunton

[57] ABSTRACT

A packaging device for packaging both magnetic and compact disk media used in the micro-computer industry. The device of the invention permits secure placement and storage and attractive packaging of 3½ inch and 5¼ inch magnetic diskettes and compact disks.

10 Claims, 3 Drawing Sheets

PACKAGING DEVICE

BACKGROUND OF THE INVENTION

Field of the Invention

The present invention relates generally to an improved packaging device for packaging both magnetic and compact disk media used in the micro-computer industry. More particularly, the invention concerns the compact packaging and distribution of software defined as executable program code or data supplied on either 5¼ inch or 3½ inch magnetic diskettes or on compact disks.

DISCUSSION OF THE INVENTION

Introduction

Presently, the micro-computer industry has no standardized packaging format for magnetic nor compact disk (CD) media. For the large and small software manufacturer, finding an appropriate packaging device is both a labor and capital intensive process. The process involves significant time and expense to find the suppliers of envelopes, boxes, binders, etc. and coordinate the design efforts that go along with creating product-/manufacturer, identity and documentation.

Because there is no packaging standard from which to work, a packaging unit that is high quality, readily available and inexpensive is needed The invention described herein fills this need by providing a transport and storage device for both magnetic and CD media that is compact, high quality and inexpensive. Additionally, the invention provides a format that allows both a large and a small developer to create its own identity and simultaneously have a standardized format for product packaging and display.

The preferred packaging unit of the present invention accommodates a maximum of two 5¼ inch diskettes, two 3½ inch diskettes and one standard size CD which can be used by both the large software manufacturer and small, third party developer.

For the large manufacturer, the packaging unit can provide transport and storage of large and small amounts of data. One CD can accommodate large amounts of data. Both sizes of magnetic diskettes can accommodate small amounts of data that apply to the distribution of single and double diskette software programs and upgrades.

For the small developer, the packaging unit provides the opportunity to transport and store relatively small amounts of data with the same look and feel of quality as the large manufacturer. Thus, the packaging unit establishes an industry standard for the large and small manufacturer alike.

One well-known and highly popular prior art packaging device is the so called "jewel box" that is used to house a compact disc. Over the last few years, the "jewel box" has become a standard method of packaging for the music industry. The "jewel box" gives the look and feel of quality in a format that allows the musician to create his or her own image through the graphics visible in the top and bottom interiors of the box.

None of the identified advantages of the "jewel box" apply to the packaging formats currently available for magnetic and CD media used in the micro-computer industry.

SUMMARY OF THE INVENTION

It is an object of the present invention to provide a highly versatile, multipurpose packaging unit for magnetic and CD media.

Another object of the invention is to provide a standardized form of packaging that is readily available to both the large software manufacturer and the small, third party software developer.

Still another object of the described invention is to provide a packaging unit of the previously mentioned character that transports and stores 5¼ inch magnetic diskettes, 3½ inch magnetic diskettes, and compact disks in a safe, protective manner.

Yet another object of the invention is to provide a packaging unit that is easy to use, compact, high quality, inexpensive to manufacture and positively protects the diskettes and CDs from damage.

DESCRIPTION OF THE INVENTION

Figure 1:
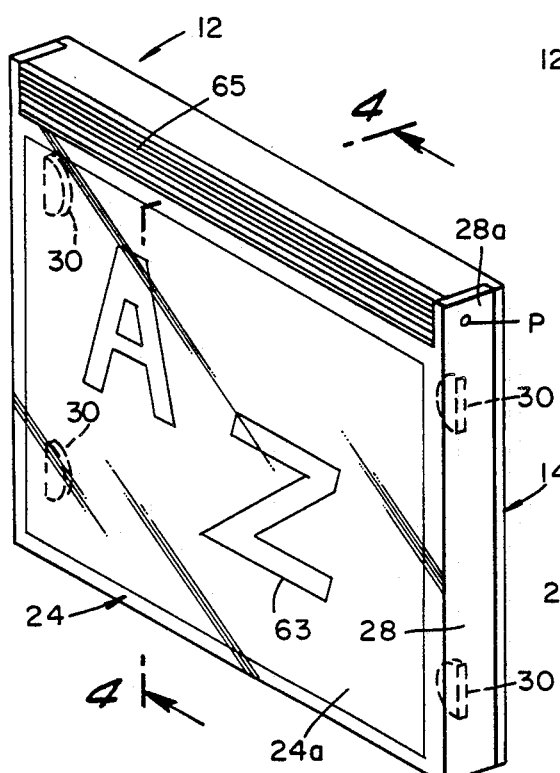
FIG. 1 is a generally perspective view one form of the packaging device of the invention.
Figure 2:
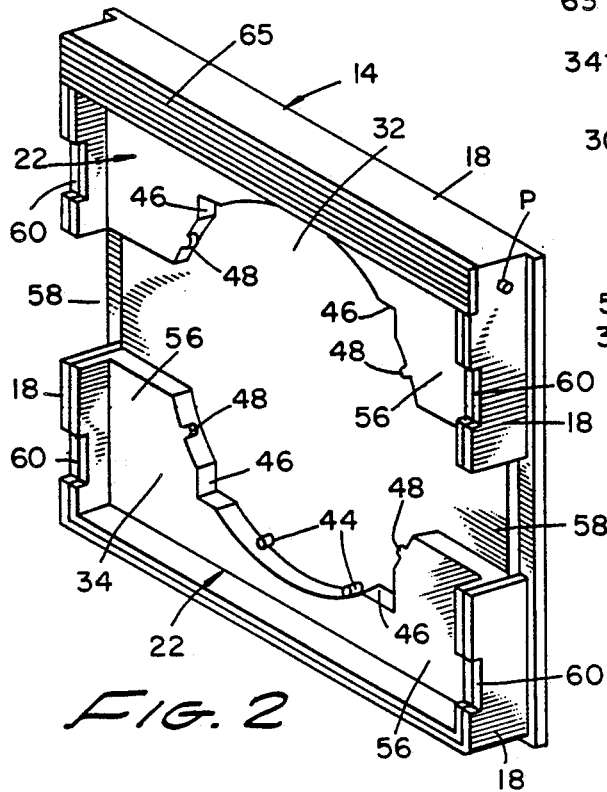
FIG. 2 is a generally perspective view of the device as it appears with the cover removed.
Figure 3:
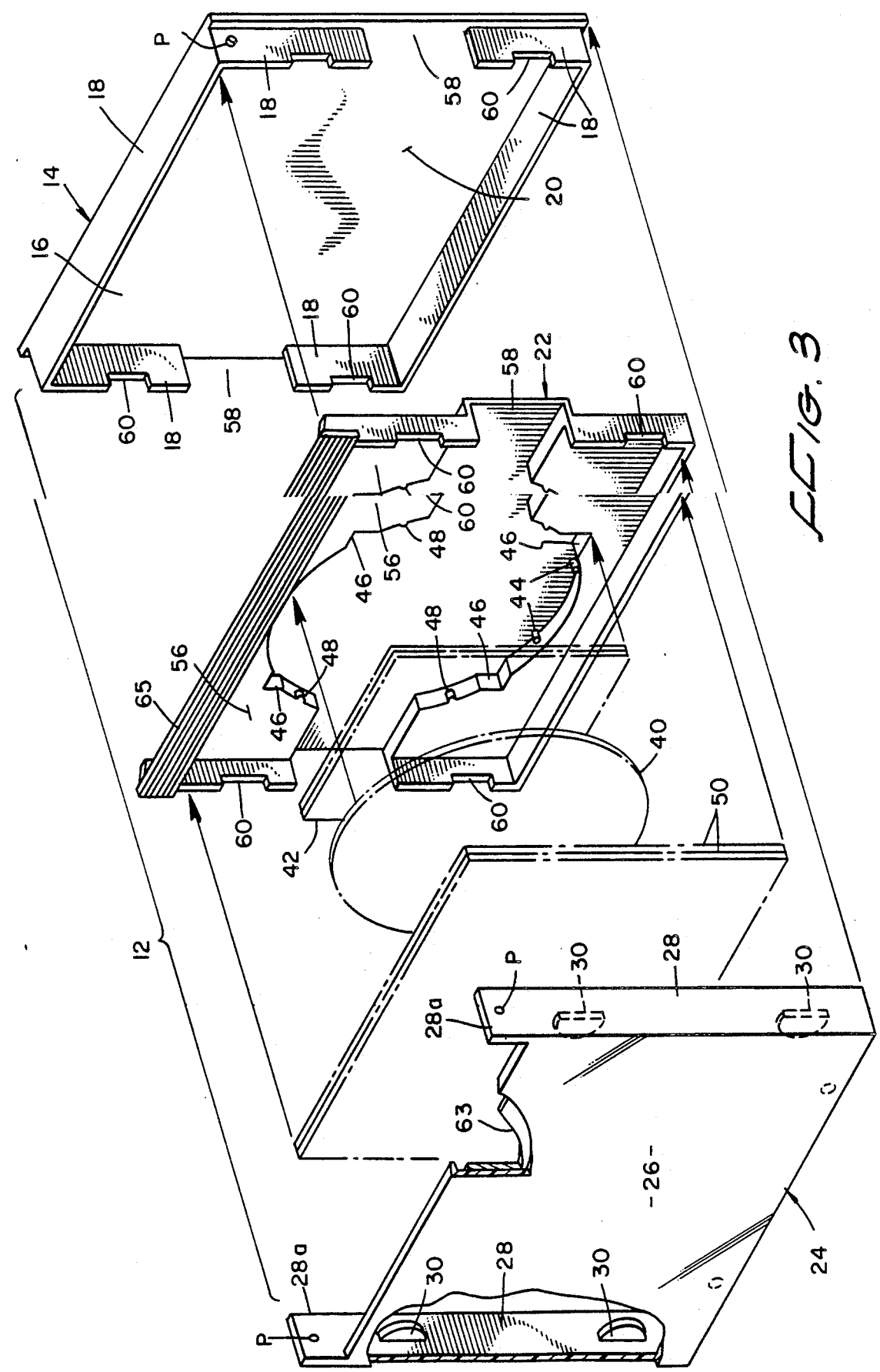
FIG. 3 is a generally perspective, exploded view of the device of the invention.

Referring to the drawings and particularly to FIGS. 1, 2, 3, the packaging device of the present invention for packaging magnetic and optical disks of specified sizes is generally designated by the numeral 12. In the embodiment of the invention shown in the drawings, the packaging device comprises a housing 14 having interconnected bottom and sidewalls 16 and 18 respectively defining an interior chamber 20; closure means operably associated with the housing for closing chamber 20 and a disk supporting insert 22 closely receivable within chamber 20. As best seen by referring to FIG. 3, the closure means is here provided and has a cover member 24 which is hingeably connected to housing 14. Cover member 24 includes interconnected top and sidewalls 26 and 28. Sidewalls 28 have outwardly extending tab portions 28a which are closely receivable over sidewalls 18 of housing 14. Cover 24 pivots about pivot points P which may comprise pivot pins extending through tab portions 28a and receivable within mating apertures provided in wall portions 18 of housing 14. Cover 24 is movable from the closed position shown in FIG. 1 to an open position which permits access to the disks stored within the device. Sidewalls 28 of cover 24 are provided with semi-circular shaped inwardly extending tabs 30, the purpose of which will presently be described.

Figure 4:
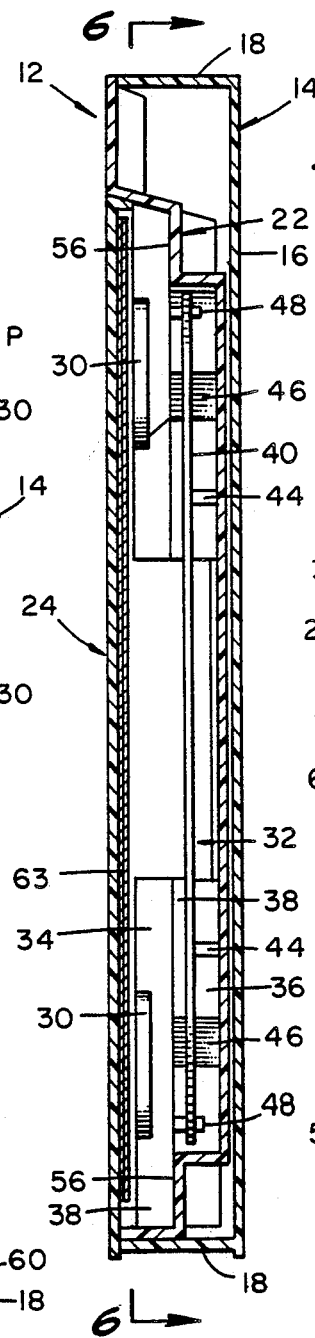
FIG. 4 is an enlarged cross-sectional view taken along lines 4—4 of FIG. 1.
Figure 5:
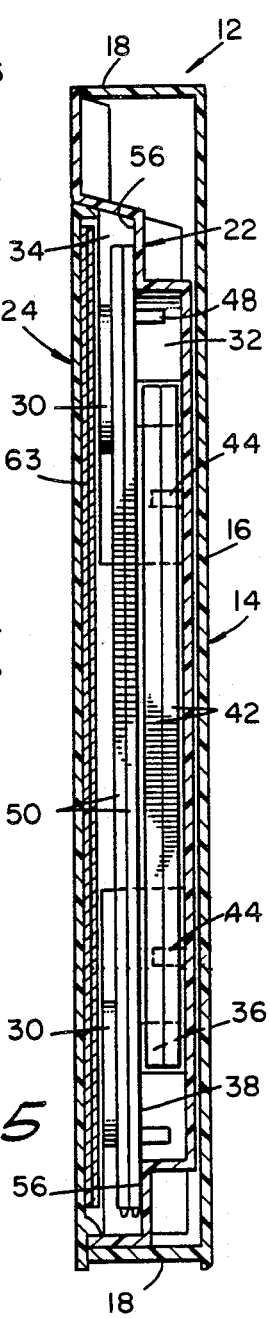
FIG. 5 is a cross-sectional view similar to FIG. 4, but showing two pair of different sized floppy disks positioned within the packaging device, rather than the compact disk positioned within the device as illustrated in FIG. 4.

In the form of the invention shown in the drawings, the disk supporting insert 26 comprises first and second disk receiving compartments 32 and 34. As best seen by referring to FIGS. 4 and 5, first disk receiving compartment 32 includes first and second portions 36 and 38 respectively. Portion 38 is superimposed over portion 36 and, as shown in FIG. 4, is adapted to receive an optical disk or CD 40. As indicated in FIG. 5, the lower portion of compartment 32 is adapted to closely receive two 3¾ inch generally rectangularly shaped computer diskette envelopes 42. As best seen in FIGS. 2 and 4, the optical disk 40 is supported within the upper portion of lower compartment 32 by means of a plurality of upwardly extending column like members 44 provided on supporting insert 22. Shown in FIG. 4, columns 44 support optical disk 40 at several points around its circumference.

Referring now to FIG. 5, when the device of the invention is used to package a pair of diskettes 42 in lieu of optical disk 40, the diskettes 42 are positioned in a superimposed relationship within the lower portion 36 of chamber 32. As indicated by the dotted lines in FIG. 6 the corners of the diskette envelopes are closely received within angular cutouts 46 formed in disk supporting insert 22. To assist in holding the 3½ inch media diskettes in position and prevent their vertical movement within chamber 32 a plurality of node rails 48 are provided on the inner vertical walls of insert 22 (FIGS. 2 and 3).

Second disk receiving compartment 34 is superimposed over first disk receiving compartment 32 and is adapted to closely receive two 5¼ inch, generally rectangularly shaped computer diskette envelopes 50 (FIG. 5). When cover 24 is closed, the previously identified tabs 30 formed on cover 24 engage the upper surfaces of the 5¼ inch diskettes in the manner shown in FIG. 5. In this way, the diskettes are securely held in position against a planar wall portion 56 formed on disk supporting insert 22.

Figure 6:
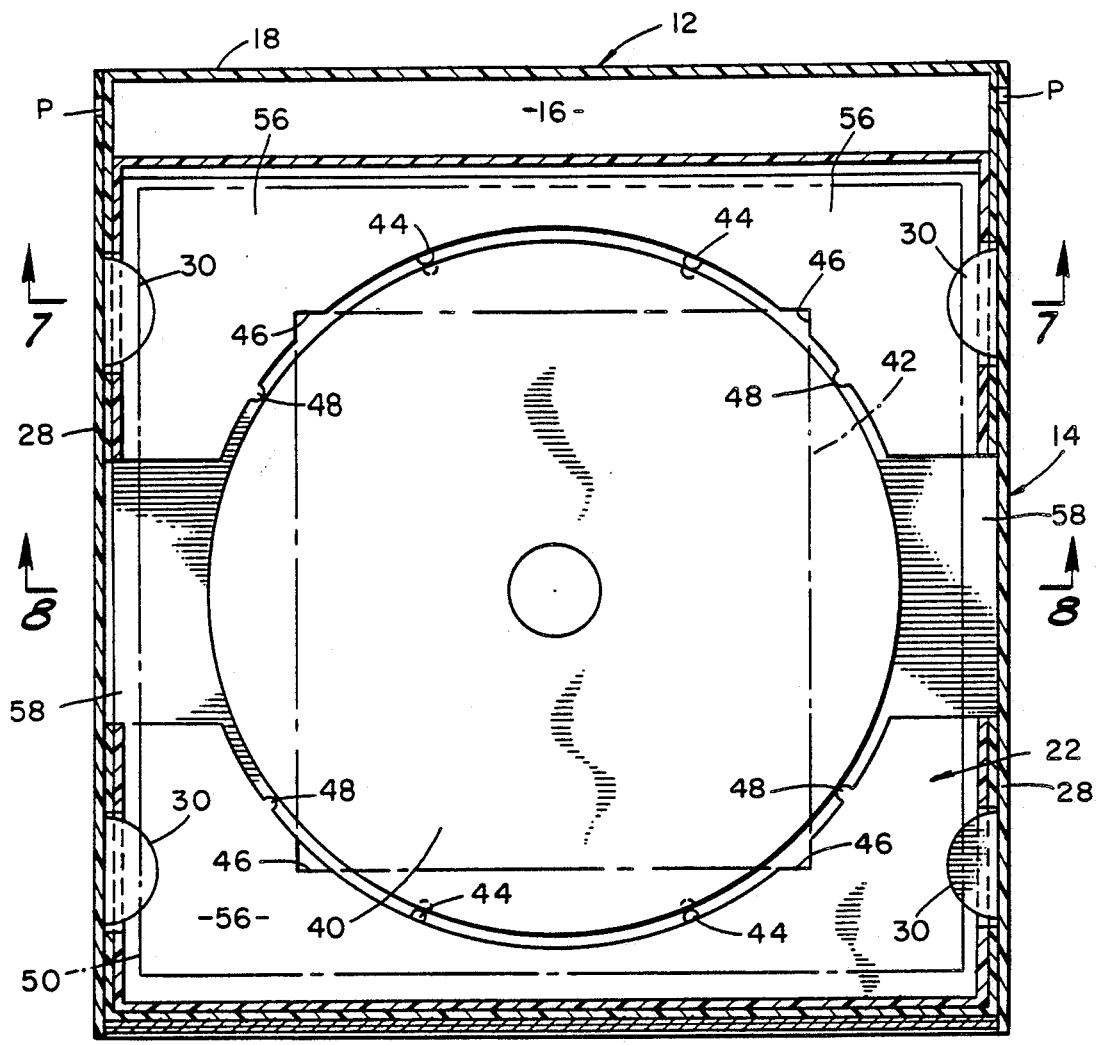
FIG. 6 is a cross-sectional view taken along lines 6—6 of FIG. 4.

When used in the manner described in the preceding paragraphs, the device of the present invention can store and transport two 3½ inch diskettes 42 in the manner shown in FIGS. 5 and 6 and two 5¼ inch diskettes 50 in the manner shown in FIG. 5. As indicated in FIG. 6, the 3½ inch diskettes 42 are closely received within the lower portion of chamber 32 with the corners thereof closely received within angular cutout portions 46 formed in insert 22. If desired, one 3½ inch diskette and one CD can be dispensed within chamber 32. As best seen in FIGS. 2 and 3, the sidewalls of the housing and the insert 22 are interrupted to provide fingerways 58 to conveniently dislodge the 3½ inch diskettes and the optical disk 40 from disk receiving compartment 32.

Figure 7:
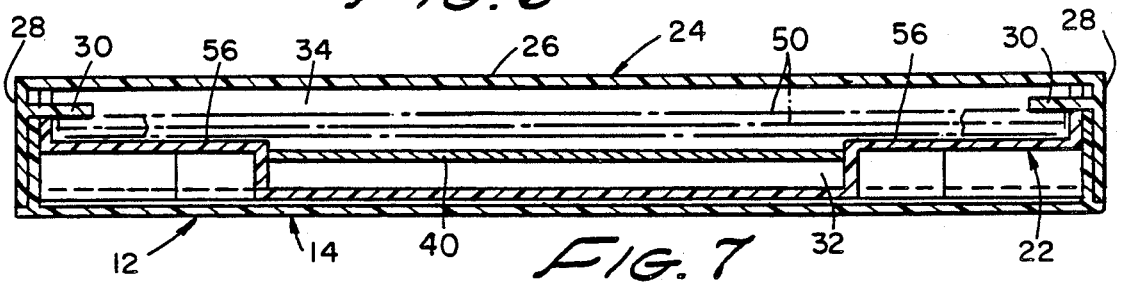
FIG. 7 is a cross-sectional view taken along lines 7—7 of FIG. 6.
Figure 8:
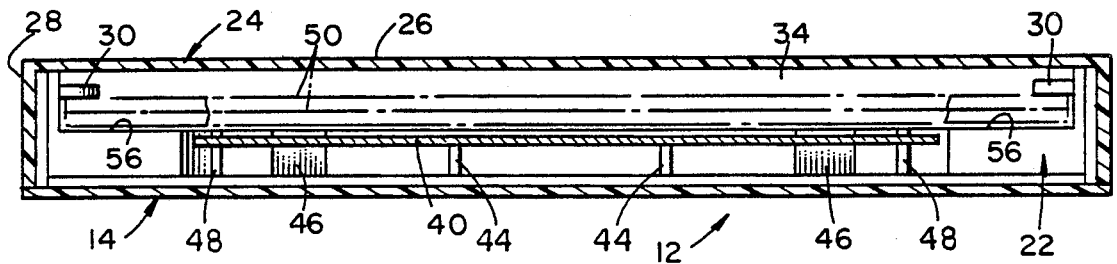
FIG. 8 is a cross-sectional view taken along lines 8—8 of FIG. 6.

When the device of the invention is used to transport and store only an optical disk 40 within chamber 32, two 5¼ inch diskettes 50 can be disposed within upper chamber 34 in the manner shown in FIGS. 7 and 8. As indicated in FIGS. 2 and 3, fingerways 60 are provided in the sidewalls of the housing and disk supporting insert to permit dislodging of the 5¼ inch diskettes.

In the preferred form of the invention, the housing 14, the cover 24 and the disk supporting insert are all constructed from a clear antistatic plastic material such as polyethylene or polystyrene. When a clear plastic sheet material is used, particularly in the construction of the top wall 24a of cover 24, preprinted advertising material 63 can be interposed between the lower surface of top wall 26 of the cover and the inwardly extending tabs 30 in the manner best seen in FIG. 4. When appropriate, one marginal portion 65 of the device can be formed of an opaque plastic suitable for imprinting thereon an appropriate design, company name, or trademark in the form of a logo and work mark (not shown).

The size of compartments 32 and 34 coupled with the strategic placement of support columns 44 and node rails 48 prevent the diskettes and the CD from shifting within the device and thus provide positive protection against damage. By constructing the device from appropriate antistatic plastic material, potentially harmful static discharge can be eliminated.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A packaging device for packaging magnetic and optical disks of specific sizes comprising:
   (a) a housing having interconnected bottom and sidewalls defining a chamber;
   (b) closure means operably associated with said housing for closing said chamber;
   (c) a disk supporting insert closely receivable within said chamber, said insert comprising:
      (i) a first disk receiving compartment having first and second portions, said first portion being adapted to closely receive at least one 3½ inch, generally rectangularly shaped computer diskette envelope, said second portion being superimposed over said first portion and being adapted to closely receive an optical disk; and
      (ii) a second disk receiving compartment superimposed over said first disk receiving compartment for closely receiving two 5¼ inch, generally rectangularly shaped computer diskette envelopes.

2. A packaging device as defined in claim 1 in which said closure means includes a cover assembly having a generally planar top wall and at least two inwardly extending tabs disposed intermediate said top wall and said second disk receiving compartment for supporting a thin planar member.

3. A packaging device as defined in claim 1 in which said first portion of said first disk receiving compartment includes at least two oppositely disposed corners defined by perpendicularly extending walls.

4. A packaging device as defined in claim 3 in which said second portion of said first disc receiving component is generally circular in plan.

5. A packaging device as defined in claim 4 in which said second disk receiving compartment is generally rectangular in plan.

6. A packaging device as defined in claim 4 further including node rail means connected to said disk supporting member for engagement with said 3½ inch diskette to prevent vertical movement thereof within said first compartment.

7. A packaging device as defined in claim 6 in which said housing and said disk supporting insert are provided with fingerways to assist in the removal of said diskettes and said optical disk from said first and second disk receiving compartments.

8. A packaging device for packaging two 3½ inch and two 5¼ inch computer diskette envelopes comprising:
   (a) a clear plastic housing having integrally formed bottom and sidewalls defining a chamber;
   (b) a plastic closure member hingeably interconnected to said housing for closing said chamber;
   (c) a disk supporting insert closely receivable within said chamber, said insert comprising:
      (i) a first disk receiving compartment having first and second portions, said first portion having a plurality of upstanding sidewalls defining four square corners, said sidewalls being spaced apart approximately 3¾ inches, said second portion being superimposed over said first portion being generally circular in plan; and
      (ii) a second disk receiving compartment superimposed over said first disk receiving compartment for receiving two 5¼ inch generally square computer diskette envelopes.

9. A packaging device as defined in claim 8 in which said first disk receiving compartment of disk supporting insert is provided with circumferentially extending upstanding wall segments disposed intermediate said upstanding sidewalls defining said four square corners.

10. A packaging device as defined in claim 8 in which said disk supporting insert includes means for engagement with said diskette envelopes to hold said envelopes in position within said disk supporting insert.

* * * * *